US008719383B2

(12) United States Patent
Chakraborty et al.

(10) Patent No.: US 8,719,383 B2
(45) Date of Patent: May 6, 2014

(54) ENHANCED METHOD TO DELIVER/PRE-LOAD CORRECTIVE HOW-TO INFORMATION TO AN END USER

(75) Inventors: Soumyajit Chakraborty, Harrison, NJ (US); James Gordon Beattie, Jr., Bergenfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 251 days.

(21) Appl. No.: 13/176,281

(22) Filed: Jul. 5, 2011

(65) Prior Publication Data

US 2013/0013728 A1 Jan. 10, 2013

(51) Int. Cl.
*G06F 15/16* (2006.01)

(52) U.S. Cl.
USPC .......................... 709/219; 709/223; 709/227

(58) Field of Classification Search
USPC .................... 709/217, 219, 223, 224, 227
See application file for complete search history.

(56) References Cited

U.S. PATENT DOCUMENTS

| | | | |
|---|---|---|---|
| 5,402,490 A * | 3/1995 | Mihm, Jr. .................. | 380/247 |
| 5,790,639 A * | 8/1998 | Ranalli et al. ............ | 379/100.08 |
| 6,910,072 B2 | 6/2005 | Macleod Beck et al. | |
| 7,127,506 B1 | 10/2006 | Schmidt et al. | |
| 7,779,067 B2 | 8/2010 | Beck et al. | |
| 2003/0193951 A1 * | 10/2003 | Fenton et al. ............. | 370/392 |
| 2007/0205734 A1 * | 9/2007 | Miyazawa et al. ........ | 318/432 |
| 2008/0278753 A1 * | 11/2008 | Oda et al. ................. | 358/1.15 |

OTHER PUBLICATIONS

U.S. Appl. No. 12/963,000 to James Fan et al., filed Dec. 8, 2010.

* cited by examiner

*Primary Examiner* — Viet Vu
*Assistant Examiner* — Keyvan Emdadi
(74) *Attorney, Agent, or Firm* — Greenblum & Bernstein, P.L.C.

(57) ABSTRACT

A computer-readable medium including an executable program for providing an information guide of a first end user device to a user of the first end user device is provided. The computer-readable medium includes a device receiving code segment that receives an identifier of a second end user device from the user. An uploading code segment, when executed, initiates uploading of the information guide to the second end user device based on the identifier of the second end user device received by the device receiving code segment. The information guide includes instructions for the first end user device.

20 Claims, 3 Drawing Sheets

ENHANCED METHOD TO DELIVER/PRE-LOAD CORRECTIVE HOW-TO INFORMATION TO AN END USER

BACKGROUND

1. Field of the Disclosure

The present disclosure generally relates to the field of information delivery. More specifically, the present disclosure relates to the field of electronically providing installation, troubleshooting, and product information guides to users.

2. Background Information

Service providers and manufacturers often provide pre-installed installation, troubleshooting, and product information guides with end user devices. Service providers and manufacturers also typically provide electronic, paper-based, or web-based installation, troubleshooting, and product information guides in addition to, or as an alternative to, the pre-installed information guides. These guides are generally not interactive and are sometimes difficult for users to parse for specific troubleshooting. Moreover, it may be difficult to keep track of such information guides or to access these information guides.

When users are unable to access or parse installation, troubleshooting, or product information guides for specific information, the users generally call a customer support help desk.

DETAILED DESCRIPTION

Figure 1:
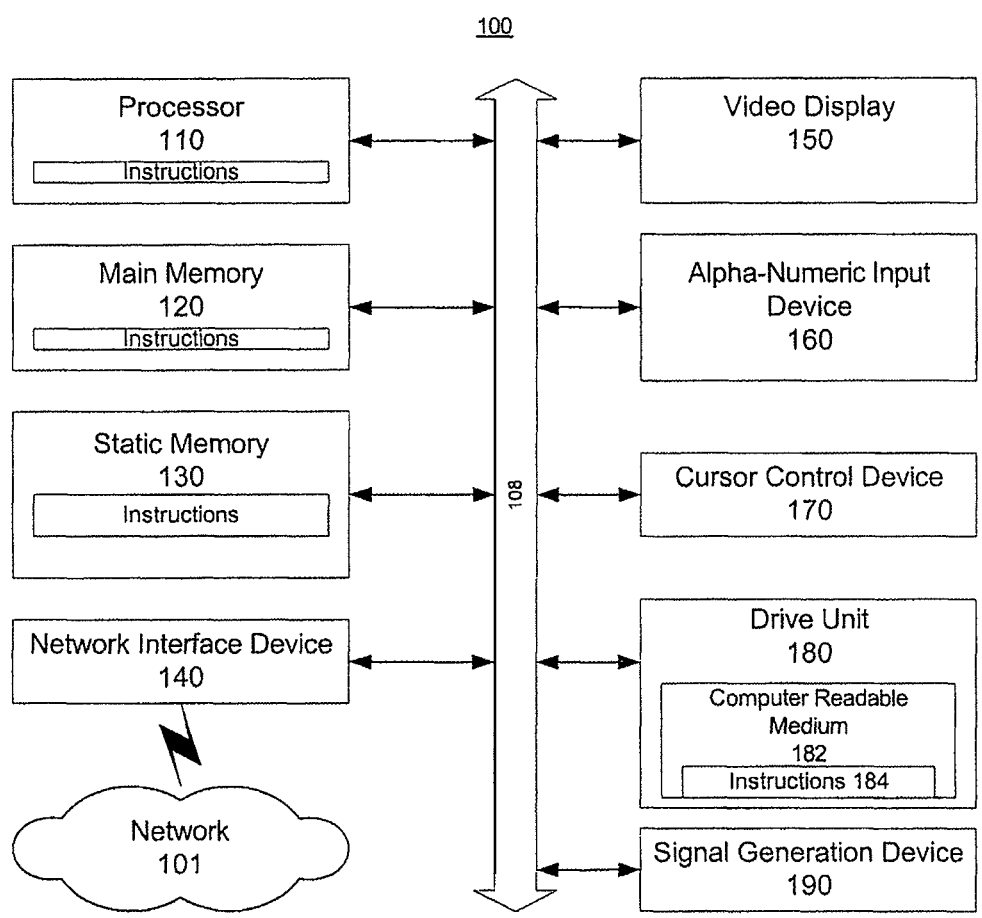
FIG. 1 shows an exemplary general computer system that includes a set of instructions for providing an information guide to a user.

In view of the foregoing, the present disclosure, through one or more of its various aspects, embodiments and/or specific features or sub-components, is thus intended to bring out one or more of the advantages as specifically noted below.

According to an embodiment of the present disclosure, a non-transitory computer-readable medium that includes an executable program for providing an information guide of a first end user device to a user of the first end user device is provided. The computer-readable medium includes a device receiving code segment that receives an identifier of a second end user device from the user. An uploading code segment, when executed, initiates uploading of the information guide to the second end user device based on the identifier of the second end user device received by the device receiving code segment. The information guide includes instructions for the first end user device.

According to one aspect of the present disclosure, the uploading code segment initiates uploading of the information guide to the second end user device in response to the device receiving code segment receiving the identifier of the second end user device.

According to another aspect of the present disclosure, the computer-readable medium further includes a request receiving code segment that receives a request to initiate uploading of the information guide to the second end user device. In this regard, the uploading code segment initiates uploading of the information guide to the second end user device in response the request receiving code segment receiving the request to initiate uploading of the information guide to the second end user device.

According to yet another aspect of the present disclosure, the computer-readable medium further includes a configuration monitoring code segment that monitors the first end user device for an abnormality. In this regard, the uploading code segment initiates uploading of the information guide to the second end user device in response to the configuration monitoring code segment monitoring the abnormality.

According to still another aspect of the present disclosure, the information guide includes instructions for resolving the abnormality monitored by the monitoring code segment.

According to an additional aspect of the present disclosure, the configuration monitoring code segment transmits an instruction to the first end user device that instructs the first end user device to enter a safe mode in response to monitoring the abnormality.

According to another aspect of the present disclosure, the computer-readable medium further includes a customer service request receiving code segment that receives a request to initiate uploading of the information guide to the second end user device when the user is interacting with a customer service representative. In this regard, the uploading code segment initiates uploading of the information guide to the second end user device in response to the customer service request receiving code segment receiving the request.

According to yet another aspect of the present disclosure, the computer-readable medium further includes a format receiving code segment that, when executed, receives a requested format for the information guide from the user. The uploading code segment initiates uploading of the information guide in the requested format.

According to still another aspect of the present disclosure, the uploading code segment initiates uploading of the information guide in a second format different than the requested format when a process of uploading the information guide in the requested format fails.

According to an additional aspect of the present disclosure, the information guide is an interactive information guide.

According to another aspect of the present disclosure, the interactive information guide is configured to receive a description of an abnormality from the user and provide at least one suggested resolution.

According to yet another aspect of the present disclosure, the computer-readable medium further includes a user history monitoring code segment that monitors a history of the first end user device in association with the user, and an information guide updating code segment that updates the information guide based on the history of the user that is monitored by the user history monitoring code segment.

According to still another aspect of the present disclosure, the computer-readable medium further includes a device history monitoring code segment that monitors a history of the first end user device in association with at least one additional user, and an information guide updating code segment that updates the information guide based on the history of the first end user device that is monitored by the device history monitoring code segment.

According to an additional aspect of the present disclosure, the computer-readable medium further includes an alternative device receiving code segment that receives an identifier of an alternative end user device different than the second end user device from the user. The uploading code segment initiates uploading of the information guide to the alternative end user device, based on the identifier of the alternative end user device when a process of uploading the information guide to the second end user device fails.

According to another aspect of the present disclosure, the computer-readable medium further includes an unsuccessful resolution receiving code segment that receives an indication from the user that an unresolved problem remains after the uploading code segment initiates uploading of the information guide to the second end user device. An alternative resolution receiving code segment transmits at least one alternative resolution option to the second end user device in response to the unsuccessful resolution receiving code segment receiving the indication that an unresolved problem remains.

According to yet another aspect of the present disclosure, the second end user device is different than the first end user device.

According to another embodiment of the present disclosure, a method for providing an information guide of a first end user device to a user of the first end user device is provided. The method includes receiving, with a network receiver, an identifier of a second end user device from the user. The method further includes initiating, with a network transmitter, uploading of the information guide to the second end user device based on the identifier of the second end user device received by the network receiver. The information guide includes instructions for the first end user device.

According to one aspect of the present disclosure, the method further includes monitoring the first end user device for an abnormality. In this regard, uploading of the information guide to the second end user device is initiated in response to monitoring the abnormality, and the information guide includes instructions for resolving the abnormality.

According to another embodiment of the present disclosure, a system for providing an information guide of a first end user device to a user of the first end user device is provided. The system includes a storage that stores the information guide. The information guide includes instructions for the first end user device. A receiver receives an identifier of a second end user device from the user. A network transmitter initiates uploading of the information guide to the second end user device based on the identifier of the second end user device received by the receiver.

According to one aspect of the present disclosure, the system further includes a monitor that monitors the first end user device for an abnormality. In this regard, the network transmitter initiates uploading of the information guide to the second end user device in response to the monitor monitoring the abnormality, and the information guide includes instructions for resolving the abnormality.

FIG. 1 is an illustrative embodiment of a general computer system, on which a method for providing an information guide of an end user device can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
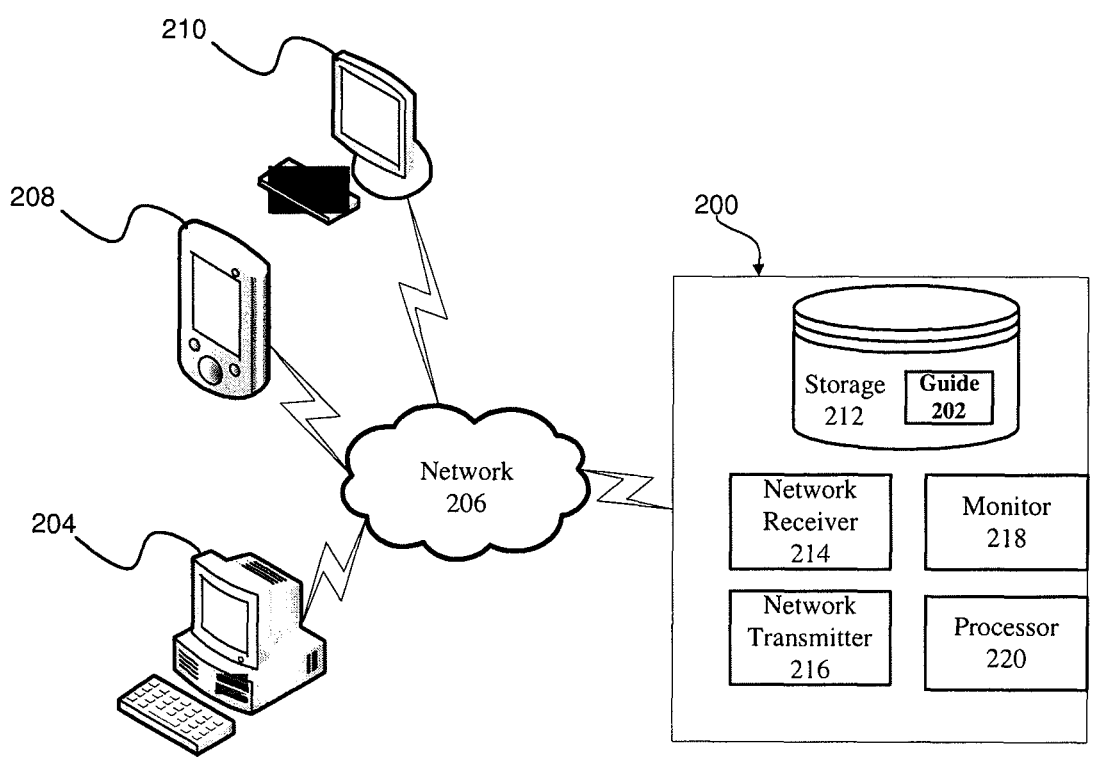
FIG. 2 is an exemplary system for providing an information guide to a user, according to an aspect of the present disclosure.

According to an embodiment of the present application, the computer-readable medium 182 includes an executable program. The computer-readable medium 182 may be executed in a system 200, as generally shown in FIG. 2, to provide an information guide 202 of a first end user device 204 to a user of the first end user device 204. Of course, those skilled in the art appreciate that the system 200 shown in FIG. 2 is merely an exemplary system and that the computer-readable medium 182 may be executed by, or in, additional, or alternative, systems.

The information guide 202 may be an installation manual for the first end user device 204, a troubleshooting manual for the first end user device 204, a product information manual for the first end user device 204, or any combination thereof. The information guide 202 is an electronic guide that may be transmitted via a network 206. The information guide 202 includes instructions for the first end user device 204. The information guide 202 may be text-based, audio-based, video-based, or any combination thereof. Of course, those skilled in the art appreciate that the above-described examples are merely exemplary and are not meant to be limiting or exhaustive. Any information guide that is commonly known and understood may be used within the scope of the present application.

The network 206, by which the electronic information guide 202 may be transmitted, is shown in FIG. 2 as a wireless network. In this regard, those skilled in the art appreciate that the network 206 may be any type of wireless network, or any additional type of network, commonly known and understood in the art, such as, but not limited to, a local area network, a wide area network, the Internet, a Bluetooth network, a wired network, or any other network.

The first end user device 204 may be any device that is used by an end user, such as, but not limited to, a television, a computer, a home theater system, a telephone, a personal data assistant, a facsimile machine, etc. The first end user device 204 is not to be limited to retail devices, and may further include any consumer premises equipment such as, but not limited to, a set-top-box, a digital video recorder, a modem, etc. Moreover, the first end user device 204 is not to be limited to devices, per se. That is, those skilled in the art appreciate that the first end user device 204 may include services, such as, but not limited to, a television service, a telephone service, an internet service, etc. Of course, those skilled in the art further appreciate that the above-described examples are merely exemplary and are not meant to be limiting or exhaustive.

The computer-readable medium 182 includes a device receiving code segment that receives an identifier of a second end user device 208 from the user. The second end user device 208 is generally different than the first end user device 204 and may be any device that is adapted to electronically receive the information guide 202. For example, the second end user device 208 may be a television, a computer, a home theater system, a telephone, a personal data assistant, a facsimile machine, etc. The second end user device 208 is also not limited to retail devices, and may further include any consumer premises equipment such as, but not limited to, a set-top-box, digital video recorder, etc. The above-described examples are merely exemplary and are not meant to be limiting or exhaustive.

The identifier of the second end user device 208 identifies the second end user device 208 or is associated with the second end user device 208 such that the information guide 202 may be transmitted to the second end user device 208 via the network 206. The identifier may be, for example, a telephone number or facsimile number of the second end user device 208 such that the information guide 202 may be transmitted to the second end user device 208 via a telephone network. The identifier may also be an Internet Protocol (IP) number, domain name, E.164 Number (ENUM), or internet facsimile number such that the information guide 202 may be transmitted to the second end user device 208 via a computer network. According to an embodiment of the present application, the identifier is specifically associated with the second end user device, and is not associated with any other end user device. That is, the identifier identifies a particular device and is not, for example, an email address which is used in conjunction with multiple end user devices but which does not identify a particular end user device. Of course, those skilled in the art appreciate that the above-described examples are merely exemplary and are not meant to be limiting or exhaustive.

According to an exemplary embodiment of the present application, the identifier of the second end user device 208 may be received by the device receiving code segment during a registration process of the first end user device 204. For example, the user of the first end user device 204 may register the first end user device 204 on a website via the internet and provide the identifier of the second end user device 208 to the website. Additionally, or alternatively, the user may register the first end user device 204 via telephone or mail, and may provide the identifier via such mediums. When the identifier of the second end user device 208 is provided via telephone or mail, the identifier may be manually input prior to being received by the device receiving code segment. The identifier of the second end user device 208 may also be input by additional, or alternative, mediums, such as, for example, via a touch-tone key pad in response to an interactive voice response prompt.

According to the above described embodiment, when the first end user device 204 is registered, a user of the first end user device 204 may also register or subscribe for access to a content repository of frequently asked questions for the first end user device 204 or for the provider or manufacturer of the first end user device 204. Information from the content repository of frequently asked questions and additional product notifications may also be provided to the second end user device 208 that is identified by the identifier. Such information may be provided automatically or upon the user subscribing to receive such information.

Of course, those skilled in the art appreciate that the identifier of the second end user device 208 is not limited to being provided during a registration process of the first end user device 204. For example, the identifier of the second end user device 208 may be provided during an installation process of the first end user device 204 or during a communication session with a customer service agent.

In this regard, the computer-readable medium 182 may include a customer service request receiving code segment that receives a request to initiate uploading of the information guide 202 to the second end user device 208 when the user is interacting with a customer service representative. The customer service representative may include human personnel or an interactive voice response agent. According to such an embodiment, the uploading code segment initiates uploading of the information guide 202 to the second end user device 208 in response to the customer service request receiving code segment receiving the request. Of course, those skilled in the art appreciate that the above-described embodiments are merely listed for exemplary purposes and are not to be considered limiting or exhaustive.

The computer-readable medium 182 further includes an uploading code segment that, when executed, initiates uploading of the information guide 202 to the second end user device 208 based on the identifier of the second end user device 208 that is received by the device receiving code segment. The information guide 202 may be pushed to the second end user device 208 by the uploading code segment, or the information guide 202 may be pulled from the uploading code segment by the second end user device 208.

After the information guide 202 is uploaded to the second end user device 208, the information guide 202 may be automatically saved on the second end user device 208. Furthermore, any processing of the information guide 202 may be automatic, such as, for example, if the information guide 202 is a compressed file that needs to be uncompressed. Moreover, after the information guide 202 is uploaded to the second end user device 208, an application or file of the information guide 202 may be automatically executed. For example, an installation file or video may be automatically executed. In this regard, during an installation process of the first end user device 204, the user may request the information guide 202, and an instructional video for installing the first end user device 204 may be automatically played on the second end user device 208 upon the information guide 202 being downloaded by the second end user device 208. Many products and services have to be self installed by a customer at her premises. Providing the installation file to the customer saves time and money for the provider or manufacturer of a product or service. Furthermore, users often refer to websites and search for related video tutorials for installation of similar products or services. Providing the installation file to the customer for the specific product or service would satisfy the customer to a high extent.

According to an embodiment of the computer-readable medium 182, the uploading code segment may initiate uploading of the information guide 202 to the second end user device 208 in response to the device receiving code segment receiving the identifier of the second end user device 208. In other words, the information guide 202 may be automatically uploaded to the second end user device 208 when the identifier of the second end user device 208 is received by the device receiving code segment. In this regard, the information guide 202 may be preloaded to the second end user device 208 before an abnormality or malfunction is detected in the first end user device 204. Additionally, or alternatively, the information guide 202 may be loaded to the second end user device 208 when the user of the first end user device 204 provides the identifier of the second end user device 208 for receiving the information guide 202.

According to another embodiment of the present application, the computer-readable medium 182 may further include a request receiving code segment that receives a request to initiate uploading of the information guide 202 to the second end user device 208. In this regard, the uploading code segment initiates uploading of the information guide 202 to the second end user device 208 in response the request receiving code segment receiving the request to initiate uploading of the information guide 202 to the second end user device 208. According to such an embodiment, the user of the first end user device 204 may provide the identifier of the second end user device 208. Thereafter, when the user of the first end user device 204 desires or needs the information guide 202 of the first end user device 204, the user may transmit a request for uploading the information guide 202 to the second end user device 208.

The computer-readable medium 182 may also include a configuration monitoring code segment that monitors the first end user device 204 for an abnormality. The abnormality may be any misconfiguration or malfunction of the first end user device 204. The configuration monitoring code segment may be pre-installed in the first end user device 204 or may be installed in the first end user device 204 upon demand. Furthermore, in additional embodiments of the present application, the configuration monitoring code segment may remotely monitor the first end user device 204. If the configuration monitoring code segment monitors the abnormality, the uploading code segment may initiate uploading of the information guide 202 to the second end user device 208. The uploading code segment may automatically initiate uploading of the information guide 202, or the uploading code segment may prompt or request the user of the first end user device 204 to upload the information guide 202 to the second end user device 208.

According to the above-described embodiments of the present application, if there are any issues with service or performance of the first end user device 204 because of a wrong configuration or malfunction, the information guide 202 may help identify the trouble and prompt the user to fix the issue. For example, if the first end user device 204 is a television and the user selects antenna as source instead of cable and it disrupts service, the information guide 202 may be provided to the user and the user may digitally look up the proper configuration or malfunction to verify the settings. Moreover, the information guide 202 that is provided to the user may further prompt the user to verify the settings, offer a correct setting, or reference the user to a specific portion of the information guide 202 based upon the detected misconfiguration or malfunction.

According to such embodiments, the information guide 202 includes instructions for resolving the abnormality monitored by the monitoring code segment. That is, the information guide 202 includes instructions for resolving the issues with service or performance. The instructions may be step-by-step instructions that prompt the user with suggestions for resolving the issues with service or performance. The instructions may be specifically provided to the second end user device 208, specifically referenced within the information guide 202, or generally included within the information guide 202. Such embodiments would save the user the time of troubleshooting the issues with service or performance and from calling up a customer care center and getting voice instructions from an interactive voice response agent or human personnel.

The configuration monitoring code segment of the computer-readable medium 182 may also transmit an instruction to the first end user device 204 that instructs the first end user device 204 to enter a safe, or troubleshooting, mode in response to monitoring the abnormality. The instruction may be transmitted internally from within the first end user device 204 when the configuration monitoring code segment is located within the first end user device 204, or the instruction may be transmitted over the network 206 to the first end user device 204 when the configuration monitoring code segment remotely monitors the first end user device 204. The instruction may cause the first end user device 204 to automatically enter the safe mode, or the instruction may prompt the user of the first end user device 204 to enter the safe mode.

According to an embodiment of the present application, a format receiving code segment, when executed, receives a requested format for the information guide 202 from the user, and the uploading code segment initiates uploading of the information guide 202 in the requested format. The format for the information guide 202 may include a general file type and, additionally, or alternatively, a particular file format. For example, the file format may generally specify a video file, an audio file, a text file, an image file, etc. Additionally, or alternatively, the file format may particularly specify a Windows Media Video file, a Joint Photographic Experts Group file, a Windows Media Audio file, a Portable Document Formal file, etc. In this regard, if a user's television service is down the user may receive a specific video tutorial on her cellular telephone with instructions for troubleshooting the downed service. Videos generally are lucid for users on how to operate a product or service and for how to fix any common problems. However, if there are bandwidth limitations on the user's cellular telephone or if the user cannot receive video on her cellular phone, the user can opt for text based prompts or instructions for installation or troubleshooting. Of course, those skilled in the art appreciate that the above-listed examples are merely exemplary and are not meant to be limiting or exhaustive.

According to an embodiment of the present application, the uploading code segment may initiate uploading of the information guide 202 in a second format different than the requested format when a process of uploading the information guide 202 in the requested format fails. For example, if the user requests the information guide 202 as a video file but bandwidth limitations of the second end user device 208 prevent the video file from being delivered, the uploading code segment may initiate uploading of the information guide 202 as a text file. The above-described example is merely exemplary and not limiting or exhaustive.

Additionally, or alternatively, to the above-described embodiment, the computer-readable medium 182 may further include an alternative device receiving code segment that receives an identifier of an alternative end user device 210 that is different than the second end user device 208 from the user. In this regard, the uploading code segment may initiate uploading of the information guide 202 to the alternative end user device 210 based on the identifier of the alternative end user device 210 when a process of uploading the information guide 202 to the second end user device 208 fails. For example, if there is a problem uploading the information guide 202 to a user's primary cell phone, the uploading code segment may initiate uploading of the information guide 202 to a computer identified by the user. As such, there is always a dedicated back-up channel for receiving the information guide 202. Of course, the above-described example is merely exemplary and not limiting or exhaustive.

According to another embodiment of the present application, the information guide 202 is an interactive information guide 202. For example, the information guide 202 may provide suggestions based upon selections made by a user.

In an additional, or alternative, embodiment of the present application, the information guide 202 may be an interactive information guide 202 that is configured to receive a description of an abnormality from the user and provide at least one suggested resolution. The interactive information guide 202 may be an intelligent system which asks the user for a problem description, decodes the problem description, and provides suggestions or options based on the problem description. Users typically perform web searches to get answers or help for a lot of troubleshooting or help issues. The local search on the information guide 202 based on step-by-step user entries will help to resolve the issue more quickly and efficiently. The interactive information guide 202 may be viewed as a virtual technician or automated instruction guide source for any service or product issue.

The computer-readable medium 182 of the present application may further include an unsuccessful resolution receiving code segment that receives an indication from the user that an unresolved problem remains after the uploading code segment initiates uploading of the information guide 202 to the second end user device 208. For example, in the above-described embodiment in which the interactive information guide 202 suggests a proposed resolution to the user, the user may indicate that the proposed resolution was unsuccessful. In response to such an indication, an alternative resolution receiving code segment may transmit at least one alternative resolution option to the second end user device 208 in response to the unsuccessful resolution receiving code segment receiving the indication that an unresolved problem remains. That is, the alternative resolution receiving code segment may propose an alternative resolution to the user.

If the user is not successful in resolving the problem with information from the information guide 202, the unsuccessful resolution receiving code segment may prompt the user for alternate options, such as, for example, offering the user to contact the provider via Internet, text message, or voice message with the issue description. Thereafter, the provider or manufacturer of the first end user device 204 may either help online or upload further instructions to the user via either the first end user device 204 or the second end user device 208.

According to the above-described embodiments, and additional embodiments, of the present application, the information guide 202 may be updated based upon the indication that the initial proposed resolution was unsuccessful.

The computer-readable medium 182 may further include a user history monitoring code segment that monitors a history of the first end user device 204 in association with the user. In other words, the user history monitoring code segment monitors a specific history of the user's first end user device 204. The user history monitoring code segment may track and log previous troubleshooting operations performed on the first end user device 204. The user history monitoring code segment may also track and log the configurations and changes to the configurations of the first end user device 204. In this regard, an information guide updating code segment may update the information guide 202 based on the history of the user that is monitored by the user history monitoring code segment. For example, the information guide updating code segment may update the information guide 202 to provide troubleshooting suggestions based on previous abnormalities detected in the first end user device 204. Of course, those skilled in the art appreciate that the above-described example is merely exemplary and that the information guide 202 may be updated in any additional, or alternative, manner.

In additional, or alternative, embodiments of the present application, the computer-readable medium 182 may further include a device history monitoring code segment that monitors a history of the first end user device 204 in association with at least one additional user. The device history monitoring code segment may also monitor the history of similar kinds of devices in the market and other demographic information. Statistics and reviews from various sources may also be monitored. The suggestions for the additional user's experience or specific trouble with a similar device or service, demographic information, statistics, and reviews may be a helpful guide for assisting the user of the first end user device 204 in troubleshooting. According to such embodiments, an information guide updating code segment may update the information guide 202 based on the history of the first end user device 204 and/or the demographic information that is monitored by the device history monitoring code segment.

According a further embodiment of the present application, a system is provided for providing the information guide 202 of the first end user device 204 to the user of the first end user device 204. An exemplary system 200 is generally indicated in FIG. 2. The system 200 may include a storage 212 that stores the information guide 202. The storage 212 may also store the identifier of the second end user device 208. In further embodiments, the storage 212 may store the alternative identifier of the alternative end user device 210, the history of the first end user device 204 in association with the user, and the history of the first end user device 204 in association with the additional user or users.

As shown in FIG. 2, the system 200 may also include a network receiver 214 that receives the identifier of the second end user device 208 from the user. The network receiver 214 may also receive the request to initiate uploading of the information guide 202 to the second end user device 208. Furthermore, in additional, or alternative embodiments, the network receiver 214 may receive the requested format for the information guide 202, the description of the abnormality from the user, and the indication from the user that an unresolved problem remains after uploading the information guide 202 to the second end user device 208.

The system 200 may further include a network transmitter 216 that initiates uploading of the information guide 202 to the second end user device 208 based on the identifier of the second end user device 208 that is received by the network receiver 214. The network transmitter 216 may also transmit the instruction to the first end user device 204 that instructs the first end user device 204 to enter the safe mode when an abnormality is monitored, and the alternative resolution option.

The system 200 may also include a monitor 218 that monitors the first end user device 204 for the abnormality. In this regard, according to an embodiment of the system 200, the network transmitter 216 initiates uploading of the information guide 202 to the second end user device 208 in response to the monitor 218 monitoring the abnormality, and the information guide 202 may include instructions for resolving the abnormality.

In additional embodiments of the system 200, as shown in FIG. 2, the system 200 includes a processor 220 that is configured to execute any combination of the above-described code segments of the computer-readable medium 182. As such, the system 200 may be configured to execute each and every function of the computer-readable medium 182 as described above, in any combination thereof.

Figure 3:
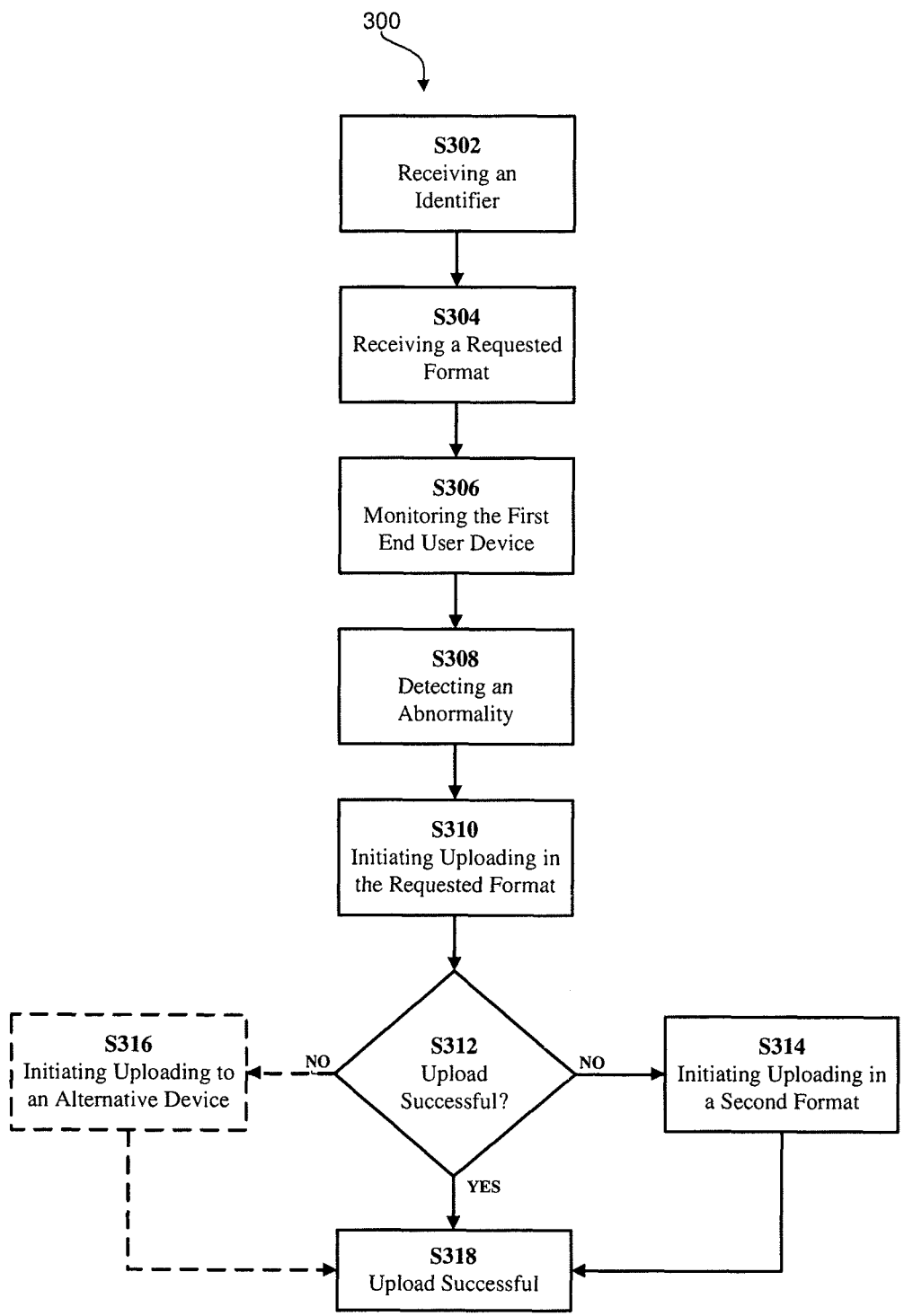
FIG. 3 is an exemplary method for providing an information guide to a user, according to an aspect of the present disclosure.

According to an additional embodiment of the present application, a method 300 for providing an information guide of a first end user device to a user of the first end user device is provided. An exemplary embodiment of the method 300 is generally shown in FIG. 3. The method 300 receives an identifier of a second end user device from the user with a network receiver at S302, and receives a requested format for the information guide at S304. The method monitors the first end user device at S306, and detects an abnormality of the first end user device at S308. In response to the detected abnormality, the method 300 initiates uploading of the information guide to the second end user device in the requested format with a network transmitter based on the identifier of the second end user device at S310.

The method 300 confirms whether the information guide was uploaded in the requested format at S312, and initiates uploading of the information guide in a second format at S314 if the information guide was not uploaded to the second end user device in the requested format. In additional, or alternative, embodiments of the method 300, the method 300 initiates uploading of the information guide to an alternative end user device at S316 in response to detecting a failed upload at S312. When it is determined that the information guide was uploaded to the second end user device or the alternative end user device, the method is terminated at S318. Of course, those skilled in the art appreciate that the above-described method 300 as shown in FIG. 3 is merely exemplary and not meant to be limiting. The scope of the present application includes additional methods which may include any combination of features as discussed above and executed by the computer-readable medium 182.

Accordingly, the present invention enables enhanced delivery of an installation, troubleshooting, or product information guide to a user while, or before, the user is engaged in a customer care process with a service or product provider or having trouble with a subscribed service or product. The enhanced delivery of the information guide may include the simultaneous carriage of voice data, text-based instructions, or video-based instructions that guide the user through a configuration or troubleshooting of the service or product. Also, the enhanced delivery of the information guide may be incorporated in a help/guide application that pushes or pulls the information guide. The enhanced delivery may be via a wireless or wired network and may be driven by a request of the user or a guidance map of the service or product provider. Depending on the trouble, the information guide may provided to an end user device specified by the user, and even to an alternate end user device specified by the user. Pre-recorded videos, text instructions, or voice instructions may also be provided to the end user device specified by the user or the alternate end user device.

The present invention would assist and help the user by preloading or loading on demand the information guide, based on detected trouble or user described trouble, into the user's choice of end device and according to the user's choice of delivery technique. The present invention also allow on demand downloading of the information guide into a customer premise equipment or the service provider uploading that for the user. It can be applicable to varied types of services or products to which the user may subscribe. Depending on the device or service, the information guide may be accessed and presented to the user in various interactive ways. For example, in electronic devices the information guide can prompt the user about current changes made, the user can also voice command or enter specific codes to describe a problem to the information guide. The information guide may then respond with a filtered set of probable causes of the problem.

The present invention would help reducing customer care traffic for basic and critical problems which may be fixed by the user herself if guided properly. Significant load to customer service centers will be reduced. Reduction in call volumes to the customer care centers for trivial and common issues will also lead to less waiting times for other customers and hence lead to improved customer satisfaction. The present invention would cut down a significant cost spent by service providers and product manufacturers for educating the customers to use services and products and to troubleshoot simple issues. The present invention would also highly satisfy a class of users as they are able to fix issues sooner and do not have to wait long on a customer service call. Moreover, the present invention would save the user time and frustration from calling a customer care center and getting voice instructions from an IVR or human personnel.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the present application is described as providing an information guide of the first end user device to the user of the first end user device. In this regard, it is to be understood that the information guide is not limited solely to an information guide per se. For example, the information guide may be an installation guide. Moreover, the information guide may be a troubleshooting guide. In other words, the information guide is not to be limited solely to a product manual.

While the computer-readable medium 182 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

The computer-readable medium 182 may comprise a non-transitory computer-readable medium or media and/or comprise a transitory computer-readable medium or media. In a particular non-limiting, exemplary embodiment, the computer-readable medium 182 can include a solid-state memory such as a memory card or other package that houses one or more non-volatile read-only memories. Further, the computer-readable medium 182 can be a random access memory or other volatile re-writable memory. Additionally, the computer-readable medium 182 can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A non-transitory computer-readable medium including an executable program for providing an information guide of a first end user device to a user of the first end user device that, when executed by a processor, causes the processor to perform operations comprising:

receiving an identifier of a second end user device from the user of the first end user device during a registration process of the first end user device;

monitoring the first end user device for an abnormality;

transmitting the information guide of the first end user device to the second end user device based on the identifier of the second end user device in response to a detection of the abnormality; and transmitting an instruction to the first end user device from an external device that instructs the first end user device to enter a safe mode when transmitting the information guide to the second end user device, wherein the information guide includes instructions for the first end user device.

2. The non-transitory computer-readable medium according to claim 1, wherein the information guide is automatically transmitted to the second end user device in response to the detection of the abnormality.

3. The non-transitory computer-readable medium according to claim 1, further comprising:

receiving a request to initiate the transmitting of the information guide to the second end user device,
wherein the transmitting of the information guide to the second end user device is further in response to the receiving of the request to initiate the transmitting of the information guide to the second end user device.

4. The non-transitory computer-readable medium according to claim 1,
wherein the instruction prompts the user of the first end user device to enter the safe mode.

5. The non-transitory computer-readable medium according to claim 1, wherein the information guide includes instructions for resolving the abnormality.

6. The non-transitory computer-readable medium according to claim 1, wherein the instruction automatically causes the first end user device to enter the safe mode.

7. The non-transitory computer-readable medium according to claim 1, further comprising:
receiving a request to initiate the transmitting of the information guide to the second end user device when the user is interacting with a customer service representative,
wherein the transmitting of the information guide to the second end user device is further in response to the customer service representative receiving the request.

8. The non-transitory computer-readable medium according to claim 1, further comprising:
receiving a requested format for the information guide from the user during the registration process of the first end user device,
wherein the information guide is transmitted in the requested format.

9. The non-transitory computer-readable medium according to claim 8, wherein the information guide is transmitted in a second format different than the requested format when the transmitting of the information guide to the second end user device in the requested format fails.

10. The non-transitory computer-readable medium according to claim 1, wherein the information guide is an interactive information guide.

11. The non-transitory computer-readable medium according to claim 10, wherein the interactive information guide is configured to receive a description of the abnormality from the user and provide at least one suggested resolution.

12. The non-transitory computer-readable medium according to claim 1, further comprising:
monitoring a history of the first end user device in association with the user; and
updating the information guide based on the history of the user.

13. The non-transitory computer-readable medium according to claim 1, further comprising:
monitoring a history of the first end user device in association with at least one additional user; and
updating the information guide based on the history of the first end user device.

14. The non-transitory computer-readable medium according to claim 1, further comprising:
receiving an identifier of an alternative end user device different than the second end user device from the user,
wherein the information guide is transmitted to the alternative end user device based on the identifier of the alternative end user device when the transmitting of the information guide to the second end user device fails.

15. The non-transitory computer-readable medium according to claim 1, further comprising:
receiving an indication from the user that an unresolved problem remains after the transmitting of the information guide to the second end user device; and
transmitting at least one alternative resolution option to the second end user device in response to receiving the indication that the unresolved problem remains.

16. The non-transitory computer-readable medium according to claim 1, wherein the first end user device comprises consumer premises equipment.

17. A method for providing an information guide of a first end user device to a user of the first end user device, comprising:
receiving, with a network receiver, an identifier of a second end user device from the user of the first end user device during a registration process of the first end user device;
monitoring the first end user device for an abnormality;
transmitting, with a network transmitter, the information guide of the first end user device to the second end user device based on the identifier of the second end user device received by the network receiver in response to a detection of the abnormality; and
transmitting an instruction to the first end user device from an external device that instructs the first end user device to enter a safe mode when transmitting the information guide to the second end user device,
wherein the information guide includes instructions for the first end user device.

18. The method according to claims 17,
wherein the instruction prompts the user of the first end user device to enter the safe mode, and
the information guide includes instructions for resolving the abnormality.

19. A system for providing an information guide of a first end user device to a user of the first end user device, comprising:
a storage that stores the information guide, the information guide including instructions for the first end user device;
a network receiver that receives an identifier of a second end user device from the user of the first end user device during a registration process of the first end user device;
a processor that monitors the first end user device for an abnormality; and
a network transmitter that transmits the information guide of the first end user device to the second end user device based on the identifier of the second end user device received by the network receiver in response to a detection of the abnormality,
wherein the network transmitter transmits an instruction to the first end user device, externally from the first end user device, that instructs the first end user device to enter a safe mode when transmitting the information guide to the second end user device.

20. The system according to claims 19,
wherein the instruction prompts the user of the first end user device to enter the safe mode, and
the information guide includes instructions for resolving the abnormality.

* * * * *